UNITED STATES PATENT OFFICE.

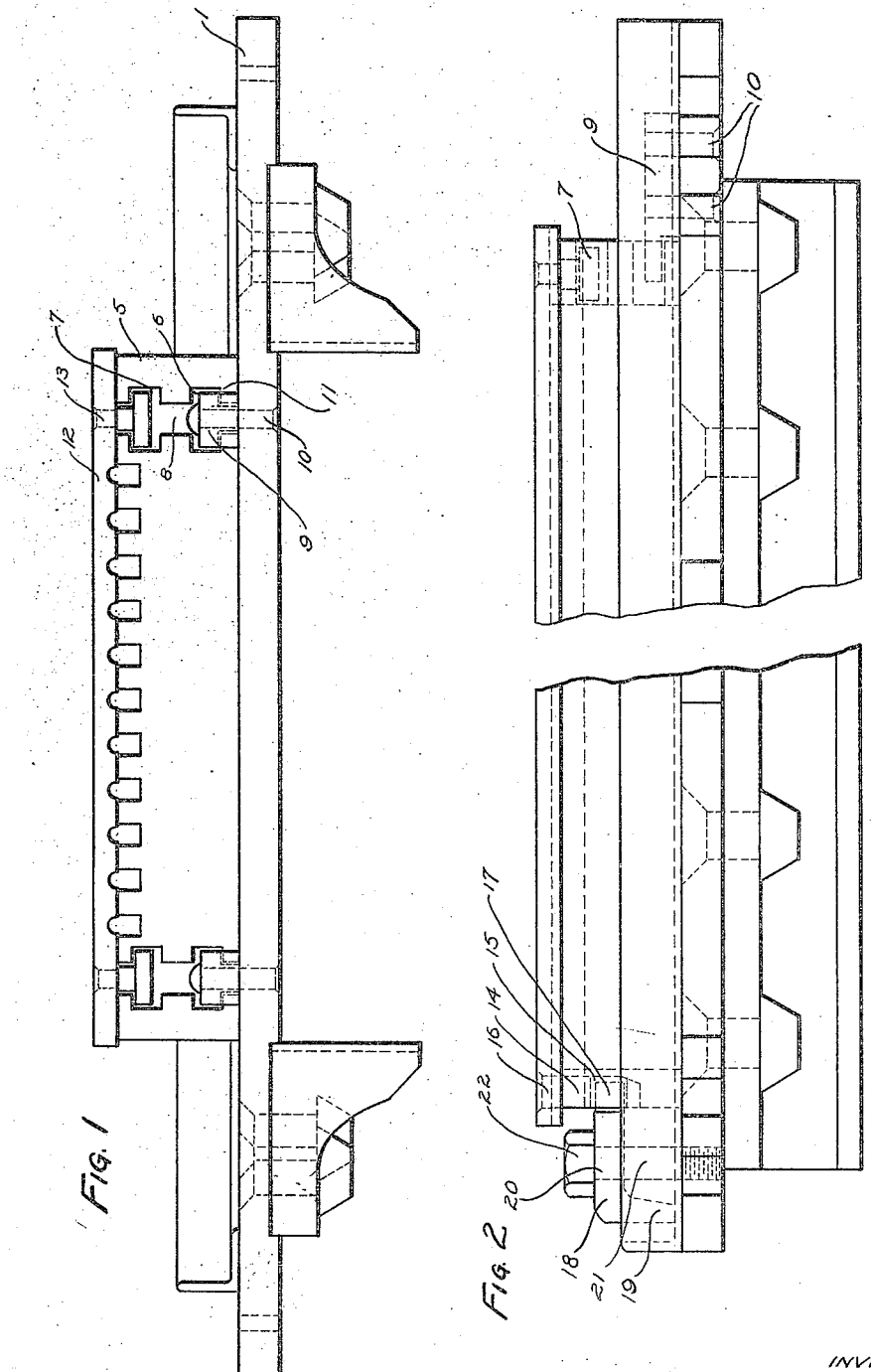

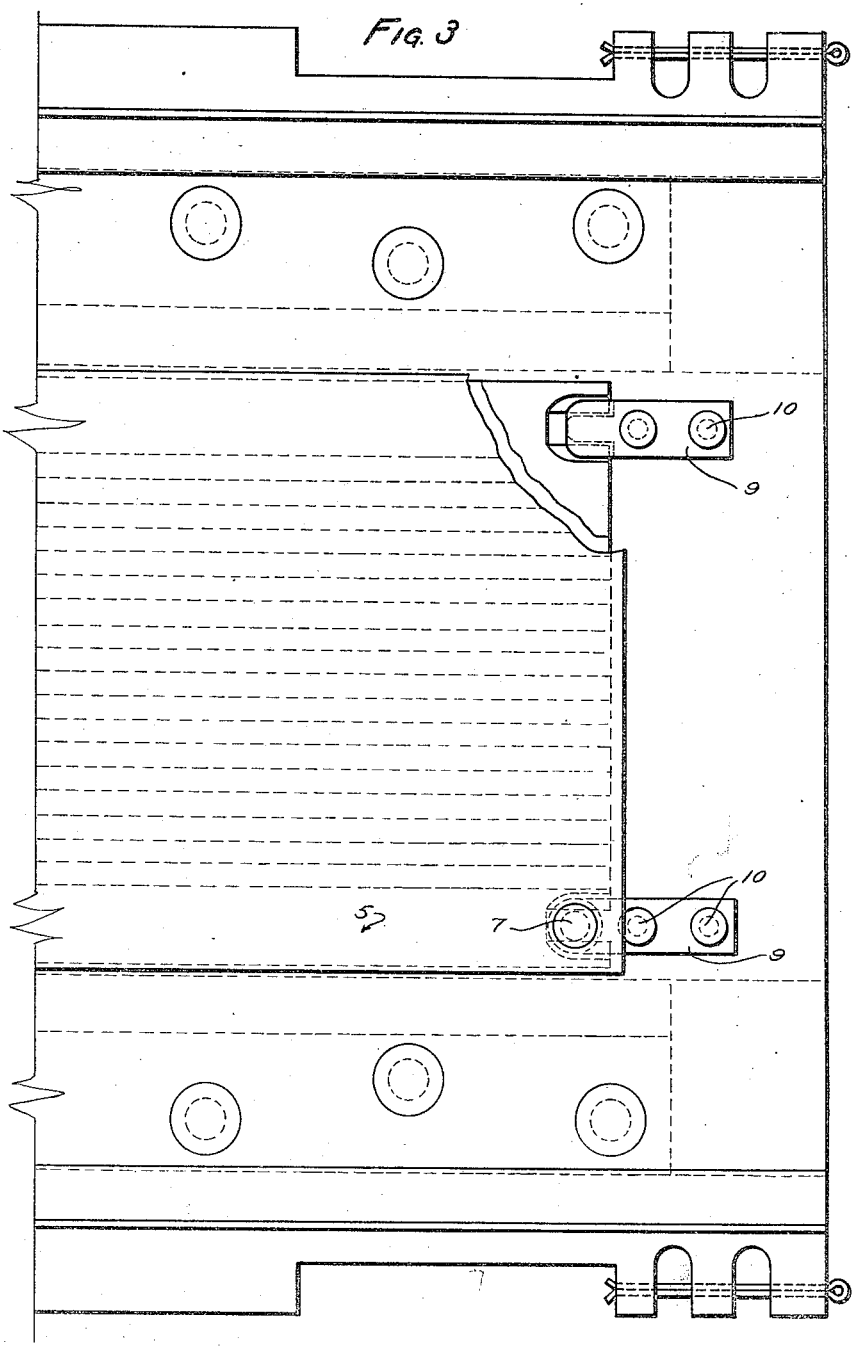

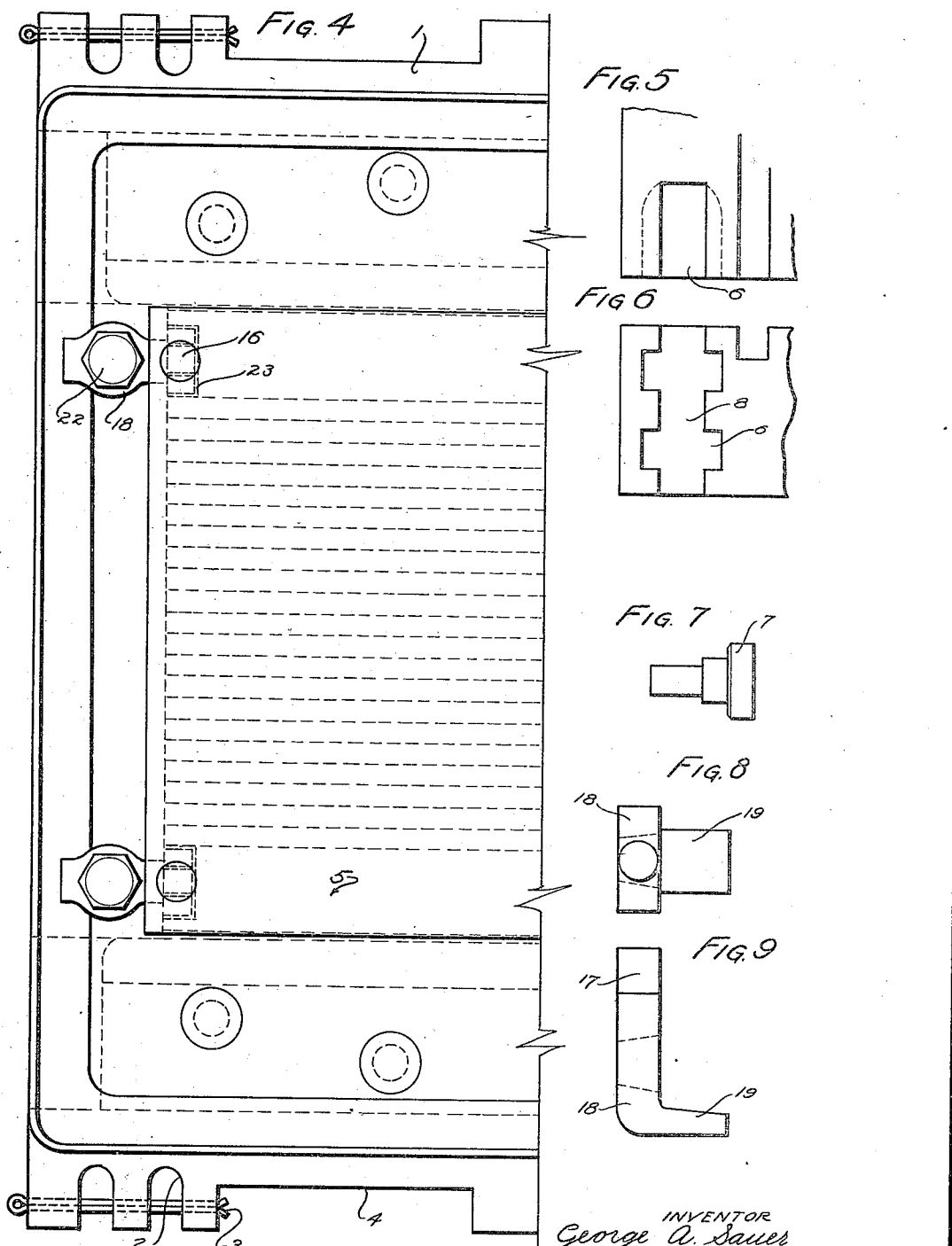

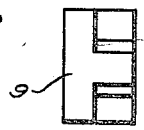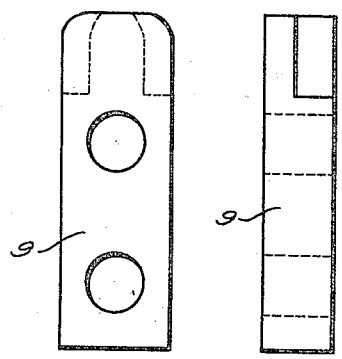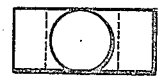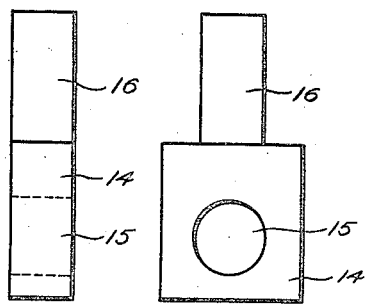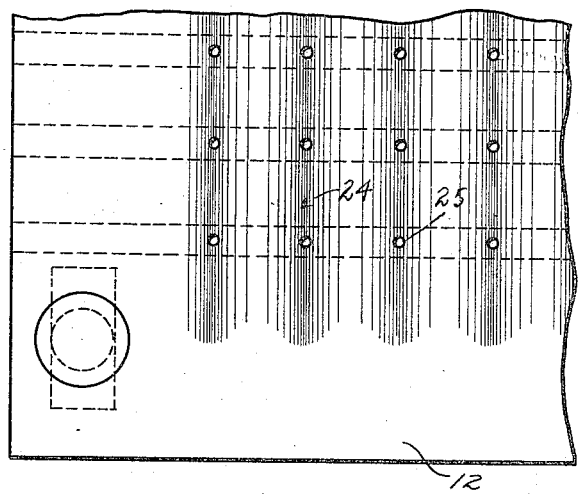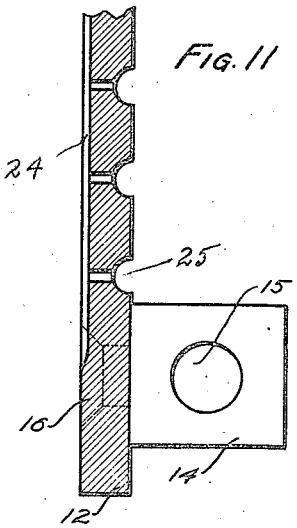

GEORGE A. SAUER, OF DAYTON, OHIO, ASSIGNOR TO BUCKEYE IRON & BRASS WORKS, OF DAYTON, OHIO, A CORPORATION OF OHIO.

OIL PRESS.

1,422,225.  Specification of Letters Patent.  Patented July 11, 1922.

Application filed January 10, 1921. Serial No. 436,152.

*To all whom it may concern:*

Be it known that I, GEORGE A. SAUER, a citizen of the United States, residing at Dayton, in the county of Montgomery and State of Ohio, have invented certain new and useful Improvements in Oil Presses, of which the following is a specification, reference being had therein to the accompanying drawings.

My invention relates to presses for oil bearing materials and in particular to the method of attachment and construction of the plate, rack and mat used in a press for expressing cotton seed oil. I do not intend to limit myself to these uses, however, but comprehend within my invention its legitimate applications.

The object of my invention is to provide a ready and sturdy means of attaching and detaching the mat to the rack and the rack to the plate of a cotton seed oil press. In making the mat of steel it has been found highly desirable to have a ready method of so attaching and detaching the several parts for cleaning and repair.

It will be readily understood that in oil presses of this character that there are a plurality of superimposed units consisting of plates, racks and mats linked together, one above the other, and that between these units the oil cake is placed for expressing the oil therefrom, which is conveyed away from the press upon being squeezed from the oil bearing material.

Referring to the drawings:

Fig. 1, is an end elevation of the assembly of the plate, rack and mat;

Fig. 2, is a side elevation of the assembly with a portion of the parts broken away;

Fig. 3, is a top plan view of one end of the assembly;

Fig. 4, is a plan view of the other end of the assembly;

Fig. 5, is a detail in plan of the slot in the rack;

Fig. 6, is a detail end elevation of this slot and rack;

Fig. 7, is a detail of the locking stud which is carried by the mat;

Fig. 8, is a detail of the locking hook to lock one end of the mat to the unit;

Fig. 9, is a side elevation of the same part of which Figure 8 is an end elevation;

Fig. 10, is a plurality of views of the locking stud co-operating with the part in Figures 8 and 9 which is carried by the mat;

Fig. 11, is an end elevation of this locking stud fastened to the mat with the mat in section;

Fig. 12, is a section of the mat showing the corrugations and the drain holes; and, Fig. 13, is a group of views of a locking member.

Referring to the drawings, 1 is a plate which is linked, by links not shown, to a plurality of other plates superimposed one above the other carried by the press. These links are carried in the slots 2 and retained therein by the cotter pin 3. The standards of the press, which act as the guides for these plates, travel in the guide ways 4 on either side of the plate. Upon the plate 1 is mounted a rack 5 that has at one end thereof apertures cut therein, such as recesses 6 and 7. These recesses consist of a pair of T-shaped slots cut into 5 and communicating with one another at 8. The mat 1 carries a plate 9 fixed to it by a rivet or bolt 10—10. This member 9 has an overhanging or projecting end spaced above the surface of the plate so that the shoulder 11 of the rack 5 may pass beneath it and be engaged by it. This provides a readily detachable means of retaining the rack upon the plate. At the top of the aperture is another T-shaped slot in which the stud 7, which is attached to the mat 12 at 13 may travel.

At the other end of the mat is a depending member 14 having an eye 15 riveted or bolted to the mat 12 at 16. This member 14 has inserted in its eye 15 the finger 17 which is a part of the L-shaped piece 18 that has a depending member 19. This L-shaped piece 18 has an opening 20 through which passes a bolt 21 and is detachably secured in the plate 1. The bolt 21 has a head 22 which prevents 18 from moving away from the plate 1 to which it is thus securely engaged.

The rack 5 is recessed at 23 (see Figure 4) to accommodate the projecting end of 17 and the depending end of 14.

The mat itself is corrugated in any desired manner with depressed portions 24 and drain holes 25.

This method of attaching and readily detaching the several parts of each unit constitutes a practical advance in the art which has materially facilitated the operation and adjustment of oil presses.

Having thus fully described my invention, what I claim as new and desire to secure by Letters Patent, is:—

1. In a press, a plate, a pair of members located on the end thereof adapted to engage the rack, a rack with apertures in the end thereof to engage with the members carried by the plate, a mat, additional apertures in said rack and depending means carried by said mat to slidably engage in said apertures in said rack.

2. In a press, a plate, a pair of members located on the end thereof adapted to engage the rack, a rack with apertures in the end thereof to engage with the members carried by the plate, a mat, additional apertures in said rack and depending means carried by said mat to slidably engage in said apertures in said rack, depending means at the other end of said mat adapted to engage with projecting means detachably secured to said plate and projecting means detachably secured to the plate.

3. In a press, a plate, a pair of members disposed respectively on either side of said plate at one end thereof with an overhanging shoulder on one end thereof spaced from the face of the plate, a rack, a T-shaped aperture on either side of the end of said rack adapted to slidably engage with said members mounted on the plate respectively, second T-shaped apertures in said end of said rack recessed in said rack, a mat, depending T-shaped lugs detachably secured on either side of the bottom of said mat adapted to slide in said second T-shaped apertures in the rack, a pair of bolts at the other end of said plate threaded therein and carrying between the head of each bolt and the plate, an L-shaped member having a projecting finger thereon, a detachably depending eye on either side of the bottom of the mat adapted to engage with said fingers, whereby the plate, rack and mat may be assembled as a unit.

In testimony whereof, I affix my signature.

GEORGE A. SAUER.